Aug. 6, 1929.  J. T. McCUTCHEON  1,723,945
OIL FILTER
Filed Sept. 3, 1927
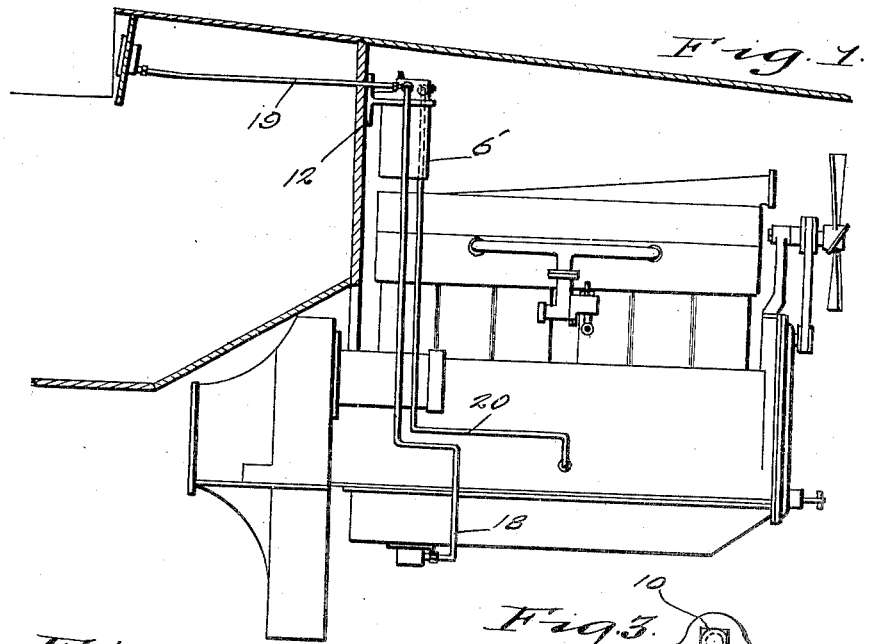
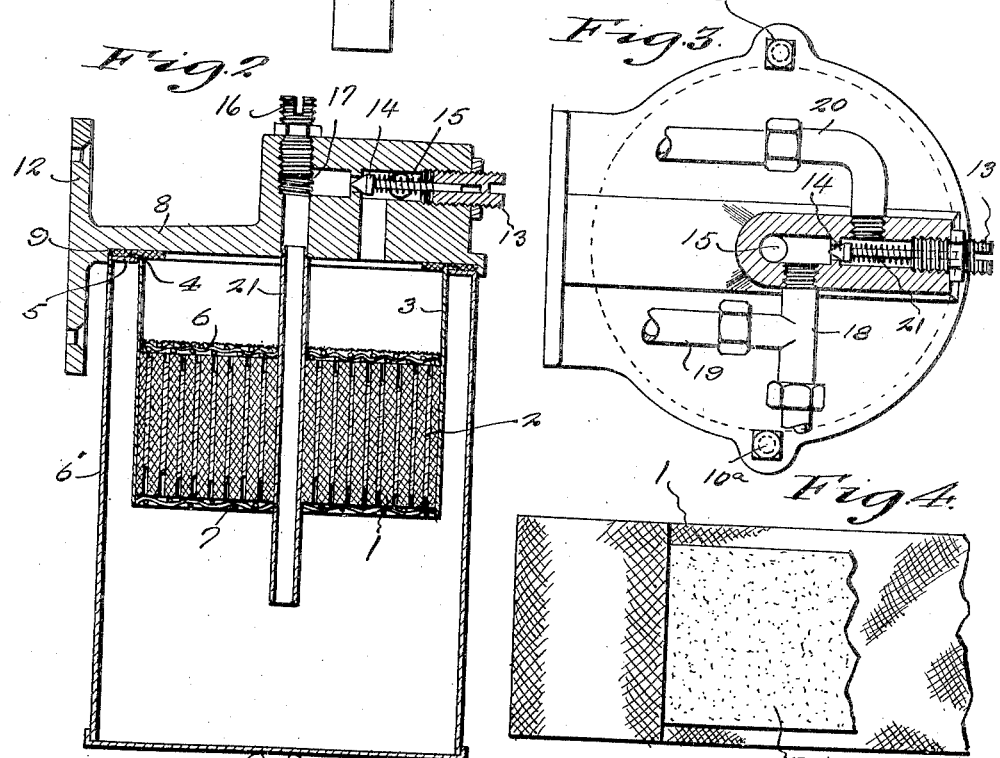
John T. McCutcheon
INVENTOR Patented Aug. 6, 1929.

1,723,945

UNITED STATES PATENT OFFICE.

JOHN T. McCUTCHEON, OF GAINESVILLE, TEXAS.

OIL FILTER.

Application filed September 3, 1927. Serial No. 217,376.

This invention relates to an oil filter especially adapted for use in connection with furnishing clean oil for lubricating the parts of an internal combustion engine, as on an automobile. The object of the invention is to provide a filter superior to that heretofore supplied to the market in effecting a more thorough filtering action and reducing the clogging of the filter with carbon, grit, sand and the like, which tend to unfit the filter for further service, and as they are comparatively high in price become a source of great expense. It is the object of my invention not only to effect better filtering action and reduce the clogging, but to provide a removable filtering material very much cheaper than has heretofore been possible. The filtering material employed is wool or cotton flannel and experience has shown that so loosely a woven fabric soon becomes clogged with sediment and no satisfactory results are obtained in an automobile, for example, after running 3,000 or 4,000 miles. I provide a more effective strainer by employing a very much closer woven fabric, such as heavy burlap interleaved with chamois which prevents the penetration of grit, and I so design my filter with a central feed pipe and an eccentric outlet that the grit, sand, etc., is mostly deposited in the bottom of a sealed can so mounted as to be readily disassembled and cleaned so that the filter becomes serviceable after a much longer period and may be readily cleaned at any intermediate stage when there is any indication of foul oil. My invention comprises also features of construction of the filter by which it may be readily disassembled, and the filtering material being cheap affords an additional advantage. Moreover, I form it in a closely wound roll forming a snug fit with a removable holder which conduces to convenience of handling and effectiveness of action.

The invention comprises a number of novel features both as to the character of the filtering material and as to the mode of mounting and of oil distribution, which will be more fully hereinafter described and will be definitely indicated in the appended claims.

In the drawings illustrating the invention:

Figure 1 shows a section of an automobile and internal combustion engine supplied with a filtering outfit embodying my invention.

Figure 2 is a sectional view of a filter embodying the invention.

Figure 3 is a transverse sectional view of Figure 1 across the cap.

Figure 4 is a diagram showing the mode of constructing the filtering material.

The material I prefer to employ as a filtering material is a heavy burlap which is of an absorptive nature and I superpose on a strip of this material, as indicated in Figure 4 at 1, a somewhat narrower strip of chamois 2, or a plurality of consecutive pieces thereof, wound into a close roll as indicated at the left part of Figure 4. This compound roll is wound to a diameter to form a snug fit with a removable holder 3 which has a flanged cylinder of thin sheet metal such as tinned iron, the flange 4 resting on an inturned shoulder 5 and container or can 6' to constitute a container of the filter. The roll of combined chamois and burlap is maintained in position between the two perforated diaphragms 6, 7, and these diaphragms may be lightly soldered or tacked in position, or locked within the flanged cylinder in any other suitable way to hold them against shifting. The lower diaphragm 7 confronting the bottom of the can is of coarser texture, having comparatively large mesh to afford a place for deposit of the sediment in the oil, the upper diaphragm 6 being of comparatively fine gauze through which the clean oil will flow. The filter holder is held in place by the cap 8 of cast metal, as aluminum, being sealed by a gasket of cork or other insoluble material 9 and clamped tight by a pair of bolts 10, 10ª and a pair of wing nuts as 11 (see Figure 2) bearing against the bottom of the can. The cover may be provided with a bracket 12 for attachment to a convenient part of an automobile, as the instrument board. The cover is provided with a plurality of ports for effecting the supply of oil and delivery therefrom. Two of these ports are provided with adjustable set screws. One of these 13 carries a spring valve 14 to close or open communication between the supply opening 15 for delivering the filtered oil, in the case of an automobile, to lubricate the various moving parts. The valve 14 has a taper face and by adjustment of the screw a greater or lesser tension may be put upon the spring, thereby adapting it to yield at variable pressures. Another set screw 16 varies the pressure of the oil feed by moving closer or farther away from the bottom of the port 17. Pipe 18 is connected with the pump, as indicated in Figure 1, and communicates with the port 14 of the cap, and a lateral branch from the pipe 18 leads to the pressure gauge of the automobile by pipe 19, while pipe 20 communicating with the valve 21 proceeds to the oil distribution of the motor, as crank case, etc., for lubricating the various parts of the engine. The oil feed of the engine being delivered under pressure enters the filter at the pipe 18 and is delivered to the port 17 and thence into the pipe 21 which is fixed in the cap and passes loosely through the filter holder 3. Oil is thereby delivered to the tank and rising therein is forced through the mesh diaphragms 6 and 7 and the intermediate filtering roll 1. Sand, carbon and other detritus lodges on the coarse screen 7 where it will accumulate and drop off into the bottom of the tank and when rising pressure on the gauge indicates that lubrication is deteriorating the filter may be taken off by loosening the nuts 11 and removing the cap and holder 3 and scraping or washing the grating. When the roll of filtering material eventually becomes foul it may be removed and another substituted at a very moderate expense.

It will be noted that the filter holder 3 lies on a higher level than the bottom of the pipe 21 and has a considerable clear space to the bottom of the can 6', thereby permitting sand and heavy grit to drop into the casing where it will not clog the filter. This reserve feature of free space in the container is of considerable importance as it prevents compacting the coarse sediment against the filter and incapacitating it from its proper function. It will thus be apparent also that with this equipment on an automobile the driver may make sure that his lubrication is effective and the oil cleaned by quickly unscrewing two screws and releasing the cap and removing the filter holder, when after a period of 5,000 or 10,000 miles there is probability that attention should be given the filter. The inexpensive character of my filter, requiring for renewal only about 50¢ to 75¢, and its rolled form permits very substantial practical advantages and permits keeping the oil absolutely clean and the lubrication in perfect condition at very slight expense.

Having thus described my invention, what I claim as new and desire to secure by Letters Patent is:

1. In an oil filter, a casing open at the top and having an inwardly extending flange surrounding the opening, a holder open at the bottom and top and having an outwardly extending flange surrounding said top for detachable engagement with the flange of the casing, a filtering element removably positioned within the bottom of the holder, a cap detachably secured upon the top of the casing and engaging the flange of the holder to removably hold the latter in position, an inlet passage extending through the cap, a pipe extending from said passage through the filtering element and having its open end spaced below the latter, and a pressure regulated valve controlled outlet communicating with the top of the holder.

2. In an oil filter, a casing open at the top and having an inwardly extending flange surrounding the opening, a holder open at the bottom and top and having an outwardly extending flange surrounding said top for detachable engagement with the flange of the casing, a filtering element removably positioned within the bottom of the holder, a cap detachably secured upon the top of the casing and engaging the flange of the holder to removably hold the latter in position, an inlet passage extending through the cap, a pipe extending from said passage through the filtering element and having its open end spaced below the latter, a pressure regulated valve controlled outlet communicating with the top of the holder, and means to regulate the passage of oil passing through the filter.

In testimony whereof I affix my signature.

JOHN T. McCUTCHEON.